No. 691,100. Patented Jan. 14, 1902.
E. BENNIS.
FURNACE.
(Application filed Dec. 28, 1897.)
(No Model.) 2 Sheets—Sheet 1.
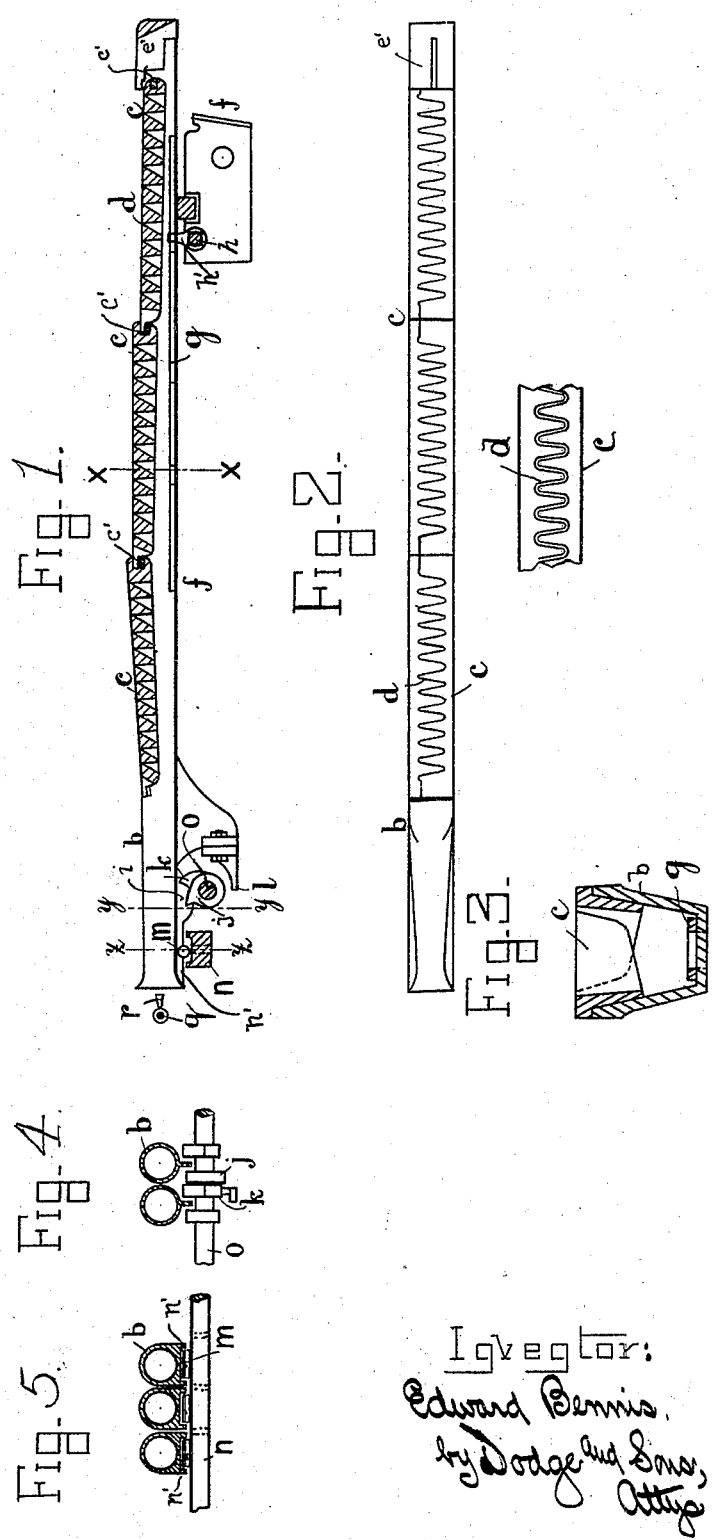

No. 691,100. Patented Jan. 14, 1902.
E. BENNIS.
FURNACE.
(Application filed Dec. 28, 1897.)
(No Model.) 2 Sheets—Sheet 2.
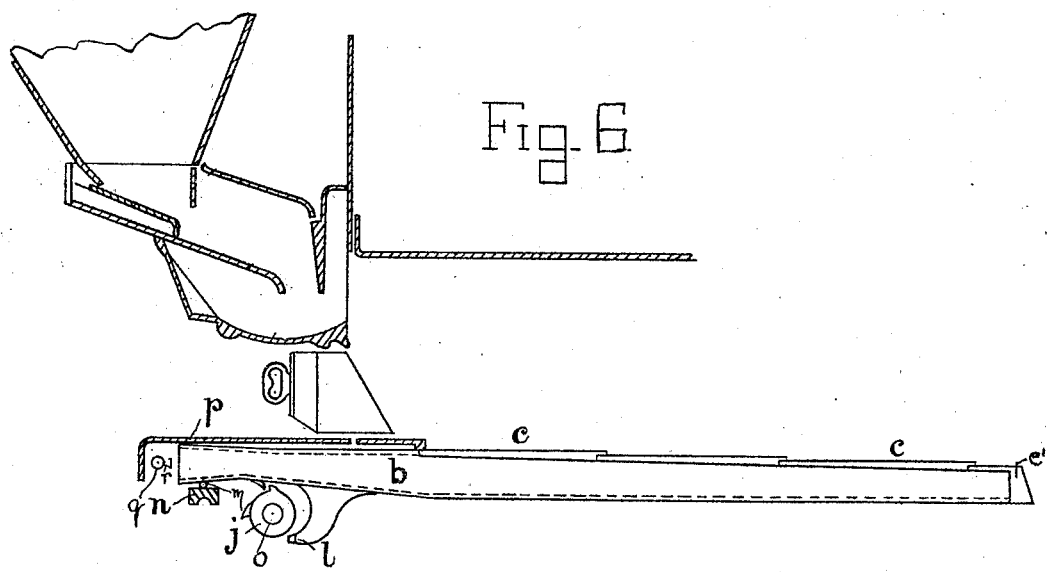

UNITED STATES PATENT OFFICE.

EDWARD BENNIS, OF BOLTON, ENGLAND.

FURNACE.

SPECIFICATION forming part of Letters Patent No. 691,100, dated January 14, 1902.

Application filed December 28, 1897. Serial No. 663,865. (No model.)

*To all whom it may concern:*

Be it known that I, EDWARD BENNIS, engineer, a subject of the King of England, residing in Bolton, in the county of Lancaster, England, have invented certain new and useful Improvements in Furnaces for Boilers and the Like, of which the following is a specification.

Figure 1 is a longitudinal section of my improved furnace or fire-bar with its accompanying parts; Fig. 2, a plan view of the same; Fig. 3, an enlarged cross-section taken on the line $x\,x$; Fig. 4, a cross-section on the line $y\,y$; Fig. 5, a cross-section on the line $z\,z$; and Fig. 6, a side elevation of the bar, showing it in its relation to the furnace.

The front end $b$ of the fire-bar is tubular in form, the narrowest portion being about three inches from the front and widening out toward the rear for about fifteen inches away from this point and also widening toward the front, so as to form a bell-mouth, as most clearly shown in Fig. 1. About eighteen inches from the front the bars are of a U cross-section cast open at the top, but closed with small grid-bars $c$, about three or four in the length of a bar. These bars are sometimes made with teeth, these teeth filling up the space on the surface of the bar and forming the platform upon which the fuel rests and also forming a zigzag or serpentine air-opening $d$, extending nearly the whole length of the furnace part of the bar, the back end of the bar $e'$ being a comparatively solid casting, with a single air-space in the center for the purpose of holding the grids in place. In place of the serpentine opening it is obvious that the upper surface of the bar can be formed of a series of smaller bars held in the sides of the main bar or that numerous slits, longitudinal, oblique, or transverse, can be formed in the upper surface of the bar instead of the single serpentine slit. The bottom of the bar from $f$ to $f$ is made with openings in it, and over these openings a bar $g$ is placed, having holes corresponding with the holes in the fire-bar, which bar $g$ is held in position by a projection $h'$, extending up from the rod $h$. When the bar moves into the fire in a manner hereinafter described, the holes in the bar or plate $g$ come opposite the holes in the fire-bar, and any dust which may have accumulated drops through, the holes being immediately closed again, so that very little air escapes.

On the bar at $i$ is cast a chilled piece, against which a cam $j$ works to draw out the bar. The second cam $k$ as it rotates presses against the projection $l$, which is preferably cast separate from the bar and bolted on, as shown, enabling the movement of the bar to be restored when it becomes worn. The bar rests upon a bearer $n$. This bearer is cast with perforations in it to enable dust to fall through, which would otherwise accumulate and interfere with the action of the rollers. The cams $j$ and $k$ are so formed and arranged on the shaft $o$ that one set of them sends all the bars into the fire together, while the others draw the bars out at separate times, this object being attained by arranging those which push the bars in together in a line, while the other cams are placed upon the cam bar or shaft one behind the other. This action is most important, as the fire is carried by the whole of the bars moving in together away from the front, and when the bars return one by one they do not bring the fire back with them; but the clinker breaks off and ashes fall through the bars, thus keeping the furnace at its highest efficiency.

The rollers $m$ are placed under the bar, preferably toward the front, and flanges $n'$ are cast on the bar extending about half-way down the roller to prevent it moving away from its proper place, these flanges being extended to where the cams work that drive the bars in and out, so that these also are kept in their place and cannot move from their position, which would otherwise cause a breakdown.

A dead-plate $p$, Fig. 6, projects over the front grid and keeps the same in position, and the front grid locks the second, and the second the third, so that they cannot be disturbed by the attendant in raking the fire when such is necessary.

The grid-bars $c$ are supported by means of cross-pieces $c'$, which engage in the slots at the forked ends of said grid-bars and which form part of or are welded across the furnace trough-bars $b$ themselves. The grids $c$, which close the bars at the top, are made with the teeth pointing toward the front of the bar at the bottom and of a V-section, so that the air rushes up between them with great force into the fire and is caught in its passage down the bar, so that the front of the fire is as good as the back, and thus equal combustion secured over every part of the furnace.

At the front of the bars a steam-tube $q$ is arranged, having nipples $r$, which point nearly to the center of the bar. The steam is superheated, preferably, by passing it into one of the flues through a steam-tube, which is suitably placed to take up the heat from the boiler-flue. The steam rushes with great force from the nipples at a short distance from the bar, and the air is driven into the bar with great force, resulting in a larger combustion of fuel and more economical results, as well as the prevention of smoke.

The cams are locked onto the shaft preferably by a hollow space or groove cast or cut into the shaft and a piece cast on the cam that fits into this hollow.

I declare that what I claim is—

1. The combination of a movable forced-draft-furnace trough-bar having a bell-mouth; a series of interlocking grid-bars forming its upper surface; and a jet placed in front of the bell-mouth at a short distance therefrom for forcing air into the same, substantially as described.

2. The combination of a movable forced-draft-furnace trough-bar having a bell-shaped mouth, said bar being provided with a series of openings in the bottom thereof; a series of grid-bars forming the upper surface of said trough-bar; a jet placed in front of and at a short distance from the bell-mouth; a perforate cleaner resting on the bottom of the trough-bar over the perforations therein; and means for holding the cleaner stationary as the trough-bar is moved.

3. In combination with an apparatus for feeding fuel to a fire, a movable forced-draft-furnace trough-bar provided with a series of openings in the bottom thereof; a series of independent perforated interlocking grid-bars forming the upper face of said main bar, said grid-bars having air-openings between them throughout the major portion of the length thereof; means for blowing air into the main bar; means for periodically moving said bar; a perforate cleaning device resting on the bottom of said movable bar over the openings therein; and means for holding said cleaning device against movement when the main bar is operated.

4. The combination of a movable forced-draft-furnace trough-bar having grid-bars forming its upper surface and provided with openings in its bottom, with a cleaning device consisting of a perforated stationary cleaner-plate $g$ lying on the bottom of the trough, the perforations in the plate and the openings in the bar being brought into and out of register by movement of the bar.

5. The combination with a movable forced-draft-furnace trough-bar having a series of cross-pieces disposed throughout its length; a series of small grid-bars arranged to interlock with each other and supported by said cross-bars; and a dead-plate supported at one end of the furnace-front and resting at the opposite end on the forward end of the approximate small grid-bar, whereby the grid-bars are held in place throughout the entire series.

6. The combination with a movable forced-draft-furnace trough-bar, of a series of small grid-bars forming its upper surface, said bars having interlocking ends and having cast thereon inclined ribs pointing toward the front of the bar, said ribs being of a substantially V-section, whereby as the air is forced into the bar it is caught by the successive ribs and driven up approximately equally all over the furnace.

In testimony whereof I have signed my name to this specification in the presence of two subscribing witnesses.

EDWARD BENNIS.

Witnesses:
ROBERT CHAMBERS,
RICHARD HAMPSON.